(12) United States Patent
Saraf et al.

(10) Patent No.: US 11,994,994 B2
(45) Date of Patent: May 28, 2024

(54) SMART PREFETCH BUFFER AND QUEUE MANAGEMENT

(71) Applicant: Analog Devices International Unlimited Company, Limerick (IE)

(72) Inventors: Aniket Akshay Saraf, Risod Karnataka (IN); Kaushik Kandukuri, Bangalore Karnataka (IN); Thirukumaran Natrayan, Bangalore Karnataka (IN); Saurbh Srivastava, Agra (IN)

(73) Assignee: Analog Devices International Unlimited Company, Limerick (IE)

( * ) Notice: Subject to any disclaimer, the term of this patent is extended or adjusted under 35 U.S.C. 154(b) by 0 days.

(21) Appl. No.: 17/728,513

(22) Filed: Apr. 25, 2022

(65) Prior Publication Data
US 2023/0342299 A1 Oct. 26, 2023

(51) Int. Cl.
*G06F 12/0862* (2016.01)
*G06F 12/02* (2006.01)

(52) U.S. Cl.
CPC .. *G06F 12/0862* (2013.01); *G06F 2212/6022* (2013.01)

(58) Field of Classification Search
CPC ................ G06F 12/0862; G06F 2212/6022
USPC ........................................................ 711/137
See application file for complete search history.

(56) References Cited

U.S. PATENT DOCUMENTS

| 5,371,870 | A | * | 12/1994 | Goodwin | ............ | G06F 12/0862 |
| | | | | | | 711/213 |
| 2004/0268051 | A1 | * | 12/2004 | Berg | ........................ | G06F 9/342 |
| | | | | | | 712/E9.047 |
| 2005/0223175 | A1 | | 10/2005 | Hepner et al. | | |
| 2007/0189105 | A1 | * | 8/2007 | Yoon | ........................ | G11C 8/04 |
| | | | | | | 365/185.08 |
| 2009/0248992 | A1 | * | 10/2009 | Sajayan | .............. | G06F 12/0862 |
| | | | | | | 711/147 |
| 2012/0072668 | A1 | * | 3/2012 | Chirca | ................ | G06F 12/0862 |
| | | | | | | 711/E12.024 |

(Continued)

FOREIGN PATENT DOCUMENTS

CN 116955222 A 10/2023

OTHER PUBLICATIONS

"European Application Serial No. 23162558.3, Extended European Search Report dated Sep. 27, 2023", 7 pgs.

(Continued)

*Primary Examiner* — Arpan P. Savla
*Assistant Examiner* — Sidney Li
(74) *Attorney, Agent, or Firm* — Schwegman Lundberg & Woessner, P.A.

(57) ABSTRACT

A memory device includes a memory array and a memory controller operatively coupled to the memory array. The memory array includes memory cells to store memory data. The memory controller includes a prefetch buffer, a read address buffer including memory registers to store addresses of memory read requests received from at least one separate device, and logic circuitry. The logic circuitry is configured to store extra read data in the prefetch buffer when an address of a read request is a continuous address of an address stored in the read address buffer, and omit prefetching the extra data when the address of the read request is a non-continuous address of an address stored in the read address buffer.

18 Claims, 5 Drawing Sheets

(56) References Cited

U.S. PATENT DOCUMENTS

2012/0331234 A1* 12/2012 Hirao .................... G06F 12/128
711/143
2017/0168723 A1 6/2017 Li et al.
2020/0218724 A1* 7/2020 Periyathambi ...... G06F 16/9558

OTHER PUBLICATIONS

"European Application Serial No. 23162558.3, Response Filed Jan. 12, 2024 to Extended European Search Report dated Sep. 27, 2023", 42 pgs.

* cited by examiner

SMART PREFETCH BUFFER AND QUEUE MANAGEMENT

BACKGROUND

Data prefetching is a technique used in computer systems to prefetch data from a slower memory and provide the data to a faster memory or a processor before the data is needed by a process being performed by the computer system. Prefetching can reduce latency and improve bandwidth of read operations. However, prefetch operations can degrade read performance if the memory locations storing the data are not in sequential order or if the prefetch buffer receives requests from multiple host devices trying to access entirely different address spaces in memory.

SUMMARY OF THE DISCLOSURE

This document relates generally to computing systems, and in particular to techniques to prefetch memory data using a smart prefetch buffer that includes logic to decide when to grant a prefetch request and perform the prefetch operation and when to ignore a prefetch request that will negatively impact system performance.

An example of a memory device includes a memory array and a memory controller operatively coupled to the memory array. The memory array includes memory cells to store memory data. The memory controller includes a prefetch buffer; a read address buffer including memory registers to store addresses of memory read requests received from at least one separate device, and logic circuitry. The logic circuitry is configured to store extra read data in the prefetch buffer when an address of a read request is a continuous address of an address stored in the read address buffer; and omit prefetching the extra data when the address of the read request is a non-continuous address of an address stored in the read address buffer.

An example of a method of operating a memory device includes receiving, by the memory device from at least one separate device, a memory read request including a current read address; comparing the current read address to previous read addresses stored in a read address buffer; prefetching non-requested extra data from one or more memory addresses contiguous to the current read address when prefetch logic circuitry determines that the current read address is a continuous address to an address stored in the read address buffer; and not prefetching the extra data when the prefetch logic circuitry determines that the current read address is non-continuous address to an address stored in the read address buffer.

An example of a computing system includes multiple host devices and a shared memory device to receive memory requests from the host devices. The memory device includes a memory array and a memory controller operatively coupled to the memory array. The memory array includes memory cells to store memory data. The memory controller includes a prefetch buffer, a read address buffer, and logic circuitry. The read address buffer includes memory registers to store addresses of memory read requests received from at least one separate device. The logic circuitry is configured to store extra read data in the prefetch buffer when determining an address of the read request is a continuous address of an address stored in a read address buffer; and omit prefetching of the extra read data when determining the address of the read request is a non-continuous address of an address stored in the read address buffer.

This section is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
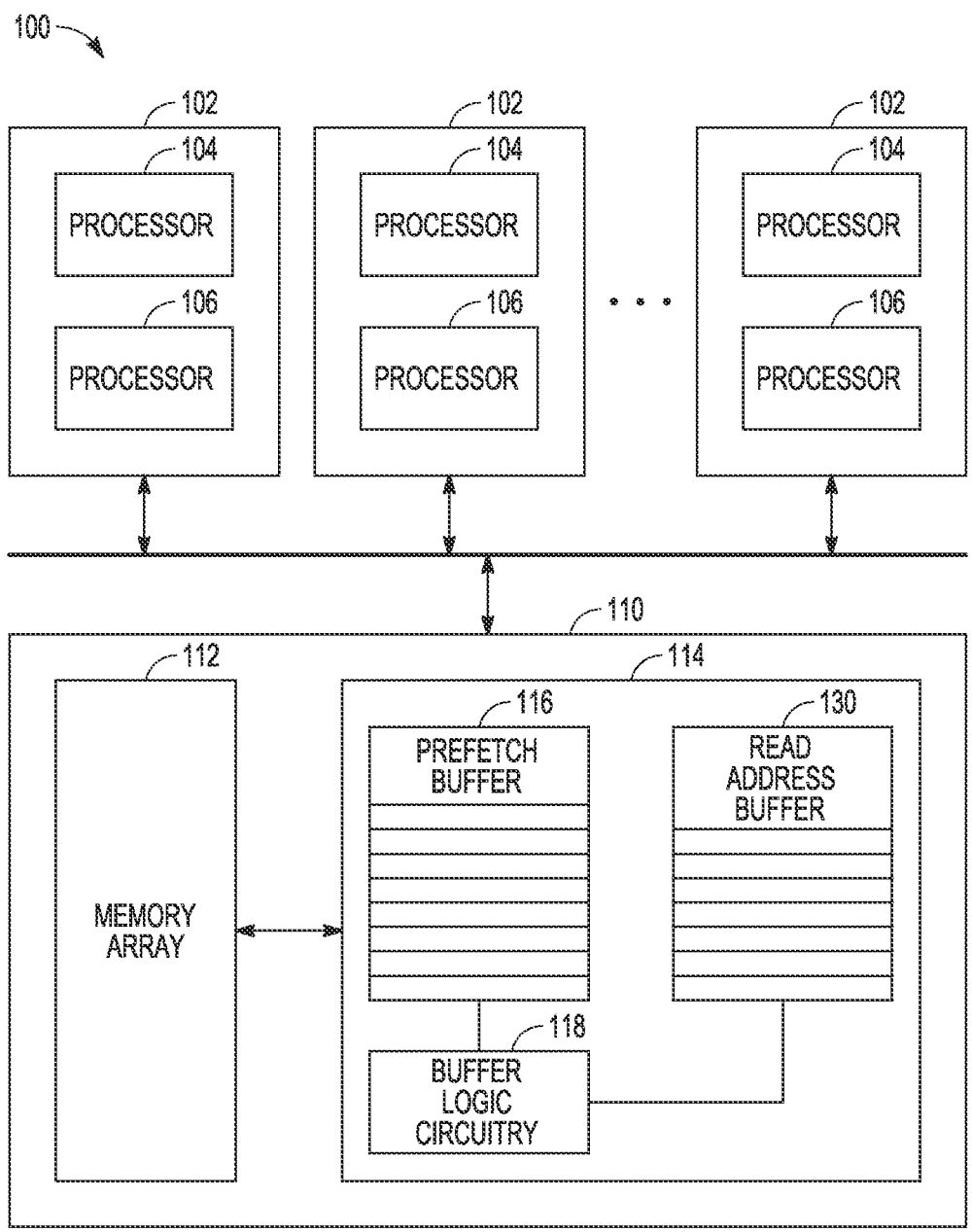
FIG. 1 is a block diagram of an example of a computing system.

FIG. 1 is a block diagram of an example of a computing system 100. The system may be distributed or centralized. The computing system 100 includes multiple host devices 102. The host devices 102 each include one or more processors 104 and memory 106 local to the host device 102. The local memory 106 is a fast memory that performs memory requests from the local processor 104 with low latency. The local memory may be a level 1 (L1) memory. The computer system 100 also includes a shared memory. The shared memory is a slower memory device 110 than the local memory and memory requests to the memory device 110 have a longer latency. The memory device 110 may include level 2 (L2) memory or level 3 (L3) memory.

The memory device 110 includes a memory array 112 and a memory controller 114. The memory array 112 includes memory cells that may be volatile memory cells or non-volatile memory cells. Volatile memory cells can include random-access memory (RAM), dynamic random-access memory (DRAM), and synchronous dynamic random-access memory (SDRAM), among others. Non-volatile memory cells can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random-access memory (RRAM), and magnetoresistive random access memory (MRAM), 3D XPoint™ memory, among others.

The memory controller 114 controls access to the memory array 112 by memory access requests received from the host devices 102. To improve read bandwidth and reduce read request latency, the memory device 110 includes a prefetch buffer 116 and prefetch buffer logic circuitry 118. The prefetch buffer 116 is a faster memory than memory array 112, and reading data from the prefetch buffer 116 involves less latency than reading data from the memory array 112. To reduce latency in read requests to the memory device 110, the memory device 110 performs internal pre-fetching of data. Successive read requests to memory are often to memory addresses within a same memory block. When a read request is received, extra read data not requested in the read request is prefetched from memory along with the requested read data and the extra data is stored in the prefetch buffer 116 in anticipation of a future read request. The logic circuitry 118 identifies the extra data not requested in the read request to load into the prefetch buffer 116.

However, if the read requests are to addresses that are too scattered and random, prefetching of data can degrade the read bandwidth because of extra time needed to perform the prefetch operations. The read bandwidth can also be degraded if one or more of the host devices 102 is overly demanding on read requests than other host devices 102. This is because the latency in serving read requests from less demanding host devices 102 will be similar to the latency for read requests to addresses that are too random.

To avoid degrading the read performance of the memory device 110, the memory controller 114 implements smart prefetching. The logic circuitry 118 recognizes when a prefetch operation will degrade read performance of the computer system 100 and omits prefetching with these read requests. The logic circuitry 118 includes circuit components such as a processor (e.g., a microprocessor) or state machine (e.g., a finite state machine) to control memory operations (e.g., read, write, and erase operations) and to implement the functions described as being performed by the logic circuitry 118. The memory device 110 also includes a read address buffer 130. The logic circuitry 118 uses information in the read address buffer 130 to determine when to perform a prefetch operation.

Figure 2:
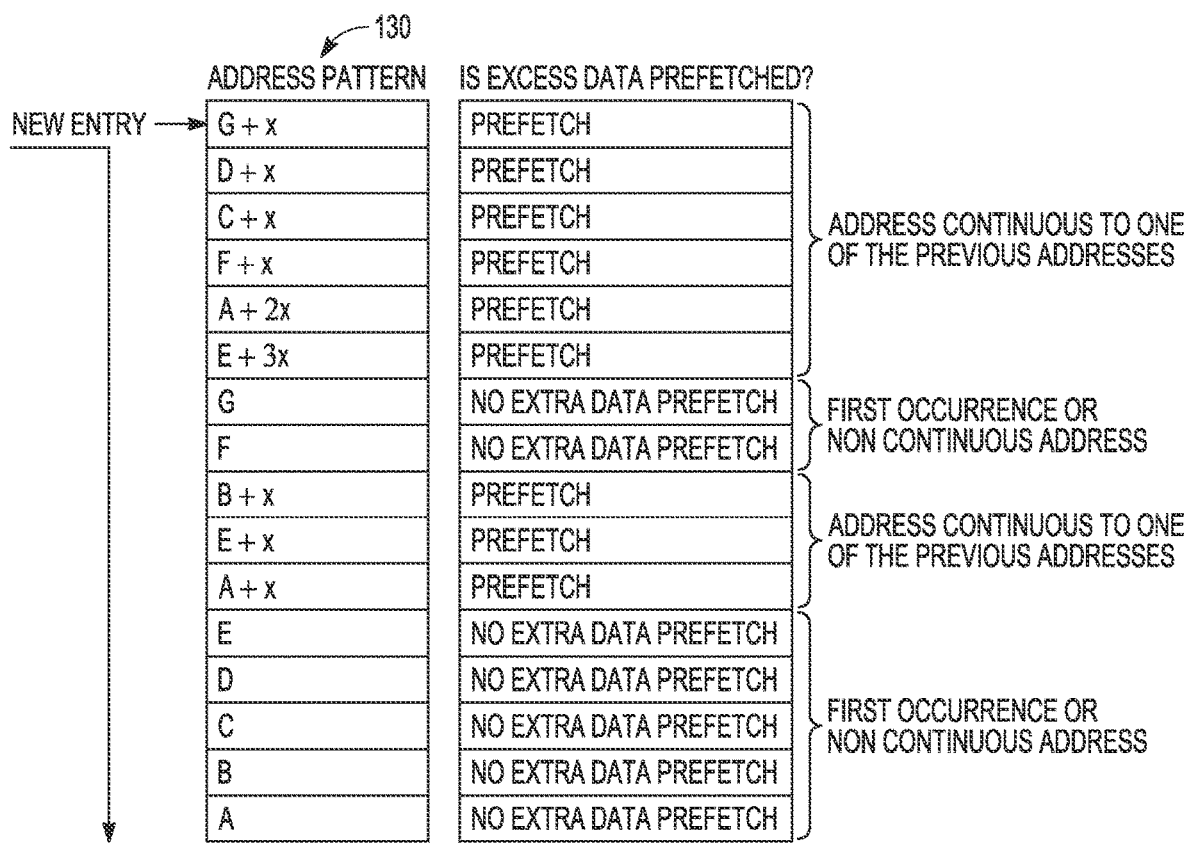
FIG. 2 is a block diagram of an example of a read address buffer for a prefetch buffer.

FIG. 2 is a block diagram of an example of the read address buffer 130. The read address buffer 130 includes multiple memory registers. The example of FIG. 2 includes 16 memory registers for simplicity of the diagram, but the read address buffer 130 may include more (e.g., 64) memory registers. The optimum number of memory registers in the read address buffer 130 may depend on the configuration of the computer system (e.g., the number of host devices, whether the shared memory is L2 or L3 memory, etc.). The read address buffer 130 may be a first-in first-out (FIFO) buffer, or shift-in shift-out (SISO) buffer. When a new memory read request is received from a host device, the memory controller 114 adds the address of the read request into the first memory register of the read address buffer 130. Stored addresses are shifted down through the read address buffer 130 as subsequent read requests are received from host devices. The example of FIG. 2 shows new address entries are added to the top of the read address buffer 130 and the current contents of the memory registers are shifted down. The read address buffer 130 tracks the read transaction history and the pattern of memory accesses that reach the prefetch buffer.

The logic circuitry 118 of the memory controller 114 determines whether to perform a prefetch operation based on whether an address continuous to the current read address is included in the read address buffer 130. If the read address is a continuous address of a read address previously received and currently stored in the read address buffer 130, the logic circuitry 118 performs a prefetch operation with the read request. If the read address is not a continuous address of a read address in the read address buffer 130, the logic circuitry 118 omits the prefetch operation.

In the example of FIG. 2, the end of the read address buffer 130 shows five read addresses A, B, C, D, and E. The comments to the right of the read address buffer 130 indicate that these addressed are the first occurrence of the addresses, and the addresses are non-continuous to each other. A prefetch operation is not performed for these addresses. The next three read addresses received were A+x, E+x, and B+x, which are continuous or sequential to addresses A, E, and B, respectively. Because these read addresses are continuous to addresses stored in the read address buffer 130, a prefetch operation is performed for the corresponding read request. The memory contents of A+x, E+x, and B+x are returned to the requesting device or devices and extra prefetched data is retrieved and stored in the prefetch buffer 116. The amount of extra data may be all or a portion of the memory block in which the read address is included.

The next two addresses F, G, are addresses that are non-continuous to another address in the read address buffer 130 and a prefetch operation is omitted by the memory controller 114. The next two addresses A+2x and E+3x are deemed to be continuous to addresses A+x and E+x, respectively, and extra prefetch data is retrieved for these read addresses. The logic circuitry 118 of the memory controller 114 may implement logic rules that deem a new address is a continuous address when the new address is within a certain number of addresses of a stored address. For instance, the logic circuitry 118 may include a rule that address E+3x is continuous to address E+x even though address E+2x is between the addresses. Other rules can be used to define continuity. For instance, the logic circuitry 118 of the memory controller 114 may deem that addresses are continuous when the addresses are within a same memory block of a predetermined size (e.g., the same block of 4096 (4 k) memory addresses).

The last three addresses of the read address buffer 130 C+x, D+x, G+x, are continuous to addresses C, D, and G, stored in the read address buffer 130 and extra prefetch data is retrieved for the read requests for addresses C+x, D+x, and G+x. It can be seen from the example of FIG. 2, that read addresses for both the omitted and the performed prefetch operations are stored in the buffer. This means that a prefetch operation may be performed for a read request with a read address continuous to a previous read request for which a prefetch operation was omitted.

Returning to FIG. 1, because the memory device 110 is not local to a host device 102, the memory device 110 can receive read requests from multiple host devices 102. Each host device 102 can issue read requests at a different frequency. The frequency with which a host device sends read requests may depend on different operating characteristics of the host device 102 (e.g., the clock domain that the host device 102 operates in, the outstanding capability of the host device 102, the configuration of the host device 102, etc.). If different host devices 102 are accessing different address ranges of the memory array 112, the asymmetrical memory accesses of the different host devices 102 may result in difficulty of prefetch operations being performed for some sequential read requests. This is because less demanding host devices (e.g., peripheral devices) will issue a read request occasionally, but highly demanding host devices (e.g., core processors, direct memory access controllers such as MDMAs, etc.) can issue back-to-back read requests for an extended time. The sequential read requests from the less demanding host devices may be shifted out of the shift register before the logic circuitry can recognize the requests as sequential.

For example, if less-demanding host devices are issuing read requests for continuous addresses but with a low frequency, and during same time duration more demanding host devices are issuing read requests with a high frequency but to an entirely different address space, then the prefetch buffer 116 may only perform prefetching with read requests from the more demanding host devices. In this case, the approach in the example of FIG. 2 may fail to recognize the continuous address accesses from the less demanding host devices 102. As a result, less demanding host devices 102 won't see any benefit of prefetching.

Figure 3:
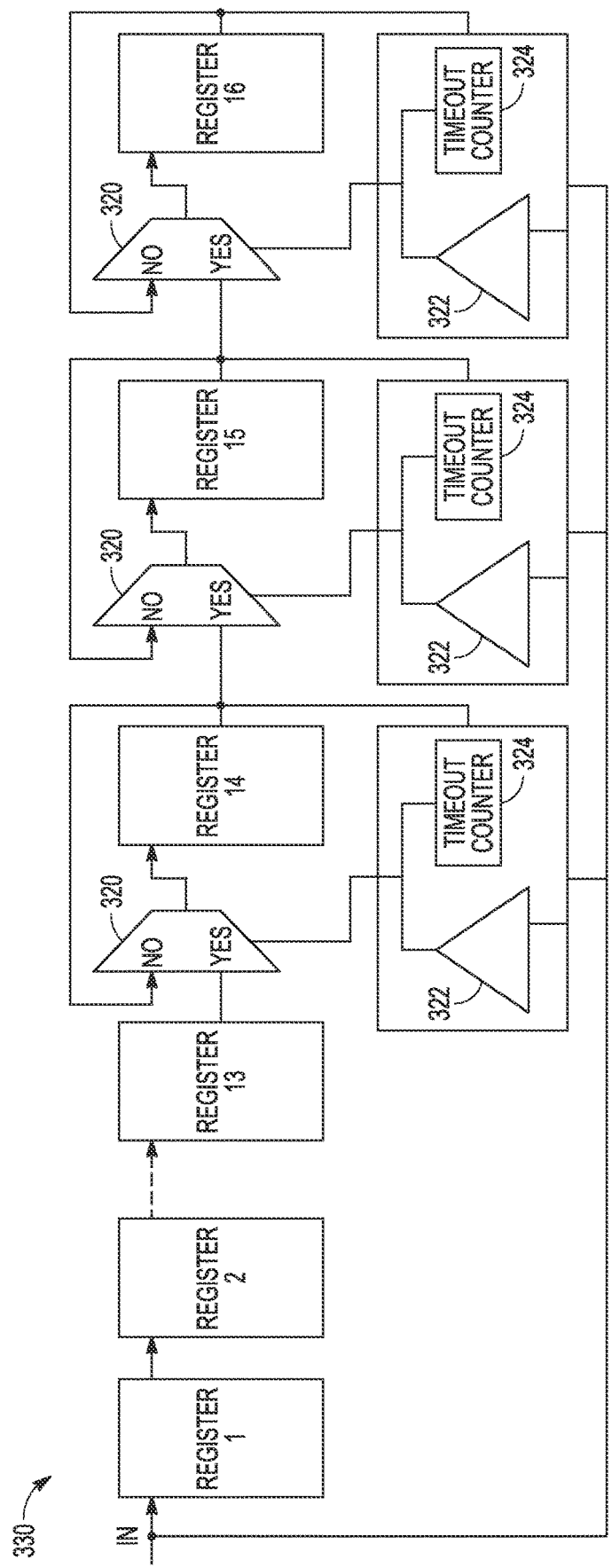
FIG. 3 is a block diagram of another example of a read address buffer.

FIG. 3 is a block diagram of another example of a read address buffer 330 that can help promote performance of prefetching by the less demanding host devices when the rate of read requests is uneven among the host devices 102. The read address buffer 330 includes 16 memory registers in the example, but the read address buffer 330 may include a different number of memory registers (e.g., 64 memory registers). The prefetch logic circuitry 118 preserves the contents of a specified number of memory registers under certain conditions. The preservable number of memory registers is some number less than the total number of memory registers in the read address buffer 330.

In the example of FIG. 3, the last three memory registers (registers 14-16) of the read address buffer 330 can be preserved, but the read address buffer 330 may preserve a different number of memory registers (e.g., 8, 10, or 12 memory registers of a 64 register read address buffer). The optimum number of memory registers to preserve may depend on the configuration of the computer system. The logic circuitry 118 preserves an address stored in a preservable memory register based on the new entries into the read address buffer 330.

For example, the logic circuitry 118 may preserve a read address in one of the preservable memory registers until a read address is received that is continuous to the preserved read address stored in the memory register. When a continuous address is received, the prefetch operation is performed and the contents of the preservable memory register are overwritten in the next shifting of the read address buffer 330. In the example of FIG. 3, the logic circuitry 118 may preserve a read address in one of the preservable memory registers until a read address is received that is within the same 4 k boundary of memory addresses as the preserved read address.

This technique promotes prefetching for the less demanding host devices. The preserving of read addresses can expire or timeout. In some examples, once a read address is preserved it is preserved for a specified number of read requests (e.g., 128 read requests). A different number of read requests can be used for the timeout, but the specified number is preferably greater than the number of memory registers in the read address buffer 330. The optimum number may depend on characteristics of the host devices, such as the number of demanding host devices, the number of less-demanding host devices, the difference in frequency of read requests by the demanding host devices and the less-demanding host devices, etc. When the number of read requests are performed without a continuous address for a preserved address being received, the preserved address is "flushed" or overwritten by shifting of the memory registers of the read address buffer 330.

In the example of FIG. 3 the logic circuitry includes a multiplexer 320, a comparator 322, and a timeout counter 324 for each of the preservable memory registers. The timeout counter 324 starts when a read address is stored in the register. When a new read address enters the prefetch buffer (IN), the new address in the first memory register is compared to the stored read address in the memory register (e.g., Register 14), such as by comparing upper tag bits of the new address to the upper tag bits of the stored address using the comparator 322 for example. If the new address is not within the same 4 k boundary as the address stored in register 14, the contents of the Register is preserved (e.g., by recirculating the data via the "NO" input of the multiplexer 320), and the timeout counter 324 is advanced (e.g., decremented). If the new address is within the same 4 k boundary as the address stored in register 14, a prefetch for the new address is performed, new contents are shifted into the Register (e.g., via the "YES" input of the multiplexer) and the timeout counter 324 is reset. New contents are also shifted into the register and the previously stored address is overwritten if the timeout counter times out (e.g., by decrementing to zero or incrementing to a specified number), but a read request continuous to the previously stored address is not received.

Figure 4:
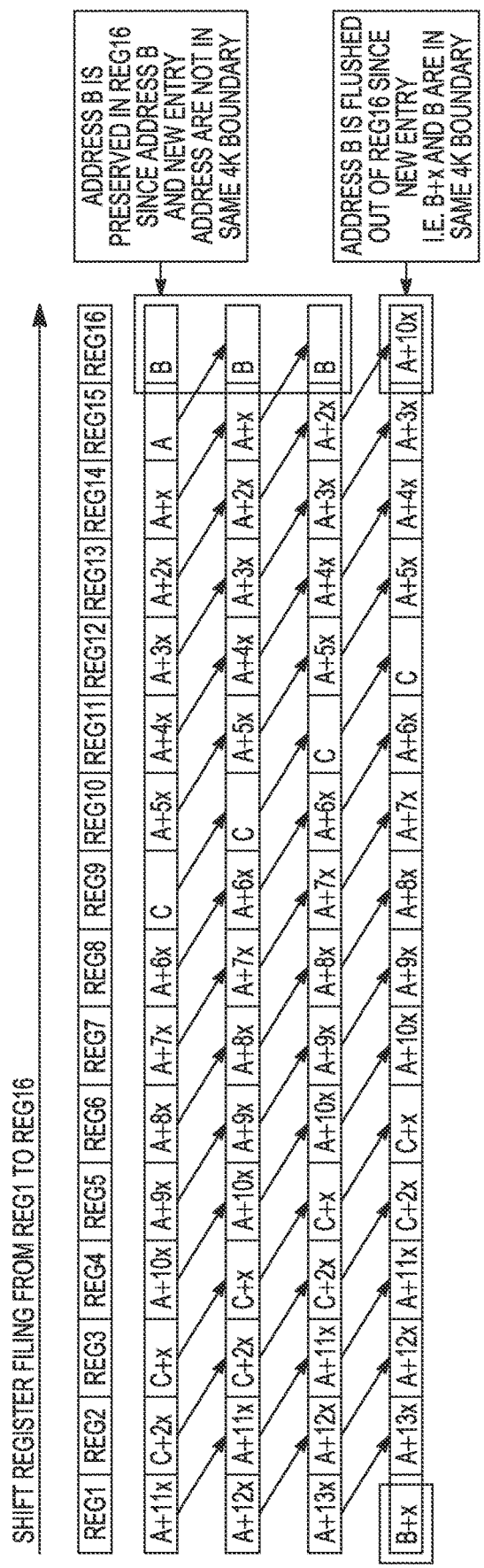
FIG. 4 is a diagram that illustrates an example of operation of the read address buffer of FIG. 3.

FIG. 4 is a diagram that illustrates an example of operation of the read address buffer 330. The read address buffer 330 in the example has 16 memory registers and the last three registers (Registers 14-16) are coupled to logic circuitry that makes them preservable. The top row of the diagram shows the contents of the 16 registers at a point in time, and the next three rows show three new entries being shifted into the shift register of the prefetch buffer. In the top row, Register 16 contains read address B, and none of the contents of Registers 1-15 includes a read address within the 4 k boundary of B. In the second row of the diagram, address A+12x is shifted into Register 1 of the read address buffer 330. Address A+12x is not within the 4 k boundary of Address B and the contents of Register 16 are preserved. Address A+12x is within the 4 k boundary of address A stored in Register 15 and address A+x in Register 14, and the contents of Registers 14 and 15 are overwritten by shifting of the Registers and not preserved. The presence of any of the addresses A+nx addresses in the read address buffer 330 would cause the contents of Registers 14 and 15 to be overwritten because they are within the 4 k boundary of the addresses stored in Registers 14 and 15.

The same is true in the third row of the diagram. Address A+12x is shifted into Register 1 of the read address buffer 330. Address A+13x is not within the 4 k boundary of address B and the contents of Register 16 are preserved. Address A+13x is within the 4 k boundary of address A+x stored in Register 15 and address A+2x in Register 14, and the contents of Registers 14 and 15 are overwritten by shifting of the Registers and not preserved.

In the fourth row of the diagram, address B+x enters the read address buffer 330 and the address is within the 4 k boundary of address B stored in Register 16. A prefetch operation for the read of address B+x is performed, and the contents of Register 16 are flushed or overwritten. Had address B not been preserved, the prefetch for address B+x would have been treated as a non-continuous address and not performed even though address B+x was actually continuous to the previous prefetch request (address B) for that host device. The last three buffer registers will retain the address tag value until at least one in subsequent 128 transaction's tag bits matches with one of these three buffers. If none of 128 subsequent transaction's tag bits matches with any or all of these last three buffers of the read address buffer 330, then those registers are overwritten.

The techniques of FIGS. 3 and 4 improve the overall system performance when the demands for read requests are not even among the host devices. Sequential accesses from less demanding host devices are determined and prefetching is done for the less demanding host devices. So subsequent accesses from less demanding masters will be hit and extra data will be provided from prefetch operations in anticipation of a subsequent read to the same memory block. The timeout count of 128 transactions covers the condition of one of the host devices stopping requests to the memory device. The last read address for this host device will be automatically removed on the 128$^{th}$ transaction entering the input of read address buffer 330.

The timeout count value of 128 transactions is selected from simulations of the computer system. Prefetching for host devices that do not request read data more than once in 128 transactions was determined to be avoided. Prefetching should be avoided for extremely sparse read transactions from any host device (e.g., less often than 128 transactions). Instead, simulation showed that the computer system performed better when such sparse memory transactions requesting data were directly provided from the memory device to the host device without prefetching. The optimum counter value may be different for different computer systems. The techniques of FIGS. 3 and 4 are flexible to accommodate changes to the parameters of the read address buffer such as the timeout count value.

Figure 5:
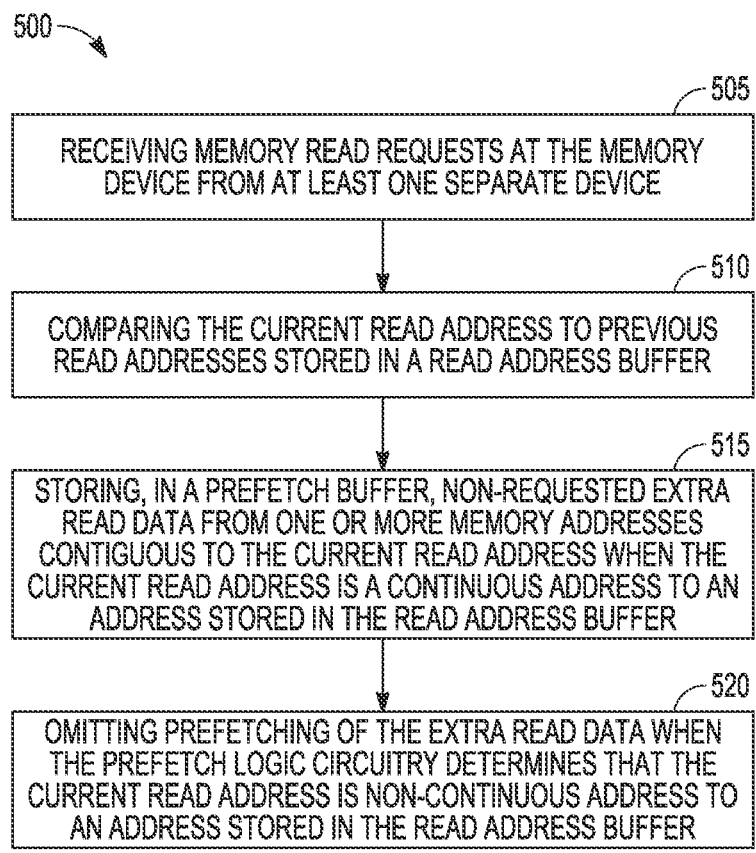
FIG. 5 is a flow diagram of an example of a method of operating a memory device.

For completeness, FIG. 5 is a flow diagram of an example of a method 500 of operating a memory device, such as memory device 110 in FIG. 1. At block 505, a memory read request is received by the memory device 110 from a separate device (e.g., at least one host device 102 in FIG. 1). The read request includes a current read address. At block 510, the current read address is compared to previous read addresses stored in a read address buffer (e.g., any of read address buffers in FIGS. 1-3).

At block 515, extra read data is stored in a prefetch buffer. The extra read data is not requested by the current read operation, and is data prefetched in anticipation of a subsequent read request close to the current read address. The extra read data is read from one or more memory addresses contiguous to the current read address when the prefetch logic circuitry determines that the current read address is a continuous address to an address stored in the read address buffer. At block 520, prefetching of the extra read data is omitted when the prefetch logic circuitry determines that the current read address is non-continuous address to an address stored in the read address buffer. The prefetch buffer and the prefetch logic circuitry can be implemented as a stand-alone memory controller, or they can be included in L2 or L3 memory, or included in a host device.

The several examples of systems, devices, and methods described provide techniques for smart prefetching of memory data. The techniques avoid prefetching operations degrading the read performance of memory devices of a computer system. Simulations have shown that the smart prefetching techniques improve bandwidth of memory requests over conventional prefetching techniques.

Additional Description and Aspects

A first Aspect (Aspect 1) includes subject matter (such as a memory device) comprising a memory array including memory cells to store memory data, and a memory controller. The memory controller includes prefetch buffer, a read address buffer including memory registers to store addresses of memory read requests received from at least one separate device, and logic circuitry. The logic circuitry stores extra read data in the prefetch buffer when an address of a read request is a continuous address of an address stored in the read address buffer, and omits prefetching the extra data when the address of the read request is a non-continuous address of an address stored in the read address buffer.

In Aspect 2, the subject matter of Aspect 1 optionally includes a read address buffer with memory registers included in a first-in first-out shift buffer and the logic circuitry is configured to store read addresses of both read requests resulting in prefetching of extra data and read requests for which prefetching was omitted in the first-in first-out shift buffer.

In Aspect 3, the subject matter of one or both of Aspects 1 and 2 optionally includes a read address buffer that is an M memory register buffer, wherein M is a positive integer. The logic circuitry optionally preserves read addresses stored in N memory registers of the M memory registers, wherein N is a positive integer less than M, and preserves a read address in one of the N memory registers until a read address is received that is continuous to the preserved read address.

In Aspect 4, the subject matter of Aspect 3 optionally includes logic circuitry that flushes the preserved read address when the read address that is continuous to the read prefetch address is received, or a read address continuous to the preserved read address is not received within P read requests of a read request corresponding to the preserved read address, where P is a positive integer greater than M.

In Aspect 5, the subject matter of one or both of Aspects 3 and 4 optionally includes a read address buffer that is a first-in first-out M register shift buffer and the logic circuitry is configured to preserve the read addresses in the last N memory registers of the first-in first-out M register shift buffer.

In Aspect 6, the subject matter of one or any combination of Aspects 3-5 optionally includes a timeout counter for each register of the N-bit registers and logic circuitry that starts the timeout counter for a register of the N-bit registers when a read address is stored in the register, preserves the contents of the register and advance the timeout counter for the register when a read address continuous to the preserved read address is not received, and enables the contents of the register to be overwritten when the corresponding timeout counter for the register times out.

In Aspect 7, the subject matter of one or any combination of Aspects 1-6 optionally includes logic circuitry that prefetches the extra data when the read address is included in a memory block that also includes at least one other address stored in the read address buffer.

In Aspect 8, the subject matter of one or any combination of Aspects 1-7 optionally includes logic circuitry that prefetches the extra data when the address of the prefetch request is within a predetermined address offset from at least one other address stored in the read address buffer, Aspect 9 includes subject matter (such as a method of operating a memory device) or can optionally be combined with one or any combination of Aspects 1-8 to include such subject matter, comprising receiving, by the memory device from at least one separate device, a memory read request including a current read address; comparing the current read address to previous read addresses stored in a read address buffer; storing, in a prefetch buffer, non-requested extra read data from one or more memory addresses contiguous to the current read address when prefetch logic circuitry determines that the current read address is a continuous address to an address stored in the read address buffer; and omitting prefetching of the extra read data when the prefetch logic circuitry determines that the current read address is non-continuous address to an address stored in the read address buffer.

In Aspect 10, the subject matter of Aspect 9 optionally includes storing read addresses in the read address buffer, wherein the read address buffer is a first-in first-out shift buffer; and prefetching the extra data when the current read address is within a specified number of addresses of a read address stored in the first-in first-out shift buffer.

In Aspect 11, the subject matter of one or any combination of Aspects 9 and 10 optionally includes storing read addresses in an M register buffer (M being a positive integer) and preserving read addresses stored in N registers of the M register buffer (N being a positive integer less than M). A read address is preserved until a read address is received that the prefetch logic circuitry determines is continuous to the preserved prefetch address.

In Aspect 12, the subject matter of Aspect 11 optionally includes a preserved read address being flushed from the M register buffer when the read address continuous to the preserved read address is received, or when a continuous read address is not received within P read requests of a read request corresponding to the preserved read address (P being a positive integer greater than M).

In Aspect 13, the subject matter of one or both of Aspects 11 and 12 optionally includes storing the read addresses stored in the last N registers of a first-in first-out M register shift buffer.

In Aspect 14, the subject matter of one or any combination of Aspects 11-13 optionally includes starting a timeout counter for each register of the N-bit registers when a read address is stored in the register, preserving the contents of the register and advancing the timeout counter for the register when a read address continuous to the preserved read address is not received, and flushing the contents of the register when the corresponding timeout counter for the register times out.

In Aspect 15, the subject matter of one or any combination of Aspects 9-14 optionally includes not prefetching the extra data when the address of the read request corresponds to a memory block that does not include any of the other read addresses stored in the read address buffer.

Aspect 16 includes subject matter (such as a computing system) or can optionally be combined with one or any combination of Aspects 1-15 to include such subject matter, comprising multiple host devices and a shared memory device to receive memory requests from the host devices. The memory device includes a memory array including memory cells to store memory data and a memory controller operatively coupled to the memory array. The memory controller includes a read address buffer including memory registers to store addresses of memory read requests received from at least one separate device, a prefetch buffer, and logic circuitry. The logic circuitry is configured to store extra read data in the prefetch buffer when determining an address of the read request is a continuous address of an address stored in a read address buffer, and omit prefetching of the extra read data when determining the address of the read request is a non-continuous address of an address stored in the read address buffer.

In Aspect 17, the subject matter of Aspect 16 optionally includes the read address buffer being an M memory register buffer (M being a positive integer), and includes logic circuitry configured to preserve read addresses stored in N memory registers of the M memory registers (N being a positive integer less than M), and preserve a read address in one of the N memory registers until a read address is received that is determined by the logic circuitry to be continuous to the preserved read address.

In Aspect 18, the subject matter of Aspect 17 optionally includes logic circuitry configured to flush the preserved read address from the read address buffer when the read address that is continuous to the preserved read address is received, or a read address continuous to the preserved read address is not received within P read requests of a read request corresponding to the preserved read address (P being a positive integer greater than M).

In Aspect 19, the subject matter of one or both of Aspects 17 and 18 optionally includes a read address buffer of the memory controller that is a first-in first-out M register shift buffer, and logic circuitry configured to preserve the read addresses in the last N memory registers of the first-in first-out M register shift buffer.

In Aspect 20, the subject matter of one or any combination of Aspects 17-19 optionally includes a timeout counter for each register of the N-bit registers, and logic circuitry configured to start the timeout counter for a register of the N-bit registers when a read address is stored in the register, preserve the contents of the register and advance the timeout counter for the register when a read address continuous to the preserved read address is not received, and enable the contents of the register to be overwritten when the corresponding timeout counter for the register times out.

In Aspect 21, the subject matter of one or any combination of Aspects 16-20 optionally includes a read address buffer that is a first-in first-out shift register that stores a record of read addresses for memory read requests.

These non-limiting Aspects can be combined in any permutation or combination. The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects. Method examples described herein can be machine or computer-implemented at least in part.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A memory device comprising:
a memory array including memory cells to store memory data;
a memory controller operatively coupled to the memory array and including:
a prefetch buffer;
a read address buffer including an M memory register buffer to store addresses of memory read requests received from multiple separate devices and preserve N memory registers of the M memory registers, wherein M and are positive integers and N is less than M; and
logic circuitry configured to:
store extra read data in the prefetch buffer when an address of a read request is a continuous address of an address stored in the read address buffer;
omit prefetching the extra data when the address of the read request is a non-continuous address of an address stored in the read address buffer;
shift read addresses stored in M-N registers of the M memory registers when the address of the read request is continuous to a read address of the one of the M-N registers and not continuous to a read address of the N registers and preserving the read addresses stored in the N registers; and
flushing a register of the N registers when the address of the current read request is continuous to a read address stored in the register of the N registers.

2. The memory device of claim 1, wherein the memory registers are included in a first-in first-out shift buffer and the logic circuitry is configured to store read addresses of both read requests resulting in prefetching of extra data and read requests for which prefetching was omitted in the first-in first-out shift buffer.

3. The memory device of claim 1, wherein the logic circuitry is configured to flush a preserved read address of the N registers when a read address continuous to the preserved read address is received, or a read address continuous to the preserved read address is not received within P read requests of a read request corresponding to the preserved read address, wherein P is a positive integer greater than M.

4. The memory device of claim 1, wherein the read address buffer is a first-in first-out M register shift buffer and the logic circuitry is configured to preserve the read addresses in the last N memory registers of the first-in first-out M register shift buffer.

5. The memory device of claim 1, including:
a timeout counter for each register of the N registers; and
wherein the logic circuitry is configured to:
start the timeout counter for a register of the N registers when a read address is stored in the register;
preserve the contents of the register and advance the timeout counter for the register when a read address continuous to the preserved read address is not received; and
enable the contents of the register to be overwritten when the corresponding timeout counter for the register times out.

6. The memory device of claim 1, wherein the logic circuitry is configured to prefetch the extra data when the read address is included in a memory block that also includes at least one other address stored in the read address buffer.

7. The memory device of claim 1, wherein the logic circuitry is configured to prefetch the extra data when the address of the prefetch request is within a predetermined address offset from at least one other address stored in the read address buffer.

8. A method of operating a memory device, the method comprising:
storing, in a read address buffer of the memory device, read addresses of memory read requests received from multiple separate devices;
receiving a memory read request including a current read address;
comparing the current read address to previous read addresses stored in the read address buffer, wherein the read address buffer is an M register buffer and N registers of the M register buffer are preserved, wherein M and N are positive integers and N is less than M;
storing, in a prefetch buffer, non-requested extra read data from one or more memory addresses contiguous to the current read address when prefetch logic circuitry determines that the current read address is a continuous address to an address stored in the read address buffer;
omitting prefetching of the extra read data when the prefetch logic circuitry determines that the current read address is non-continuous address to an address stored in the read address buffer;
shifting read addresses stored in M-N registers of the M register buffer when the current read address is continuous to the read address of the one of the M-N registers and preserving the read addresses stored in the N registers of the M register buffer when the current read address is not continuous to a read address stored in the N registers; and
flush a register of the N registers when the current read address is continuous to a read address stored in the N registers.

9. The method of claim 8, including:
storing read addresses in the read address buffer, wherein the read address buffer is a first-in first-out shift buffer; and
wherein storing the extra data includes prefetching the extra data when the current read address is within a specified number of addresses of a read address stored in the first-in first-out shift buffer.

10. The method of claim 8, wherein a preserved read address is flushed from the N registers when the current read address is continuous to the preserved read address, or a continuous read address is not received within P read requests of a read request corresponding to the preserved read address, wherein P is a positive integer greater than M.

11. The method of claim 8, wherein the preserving the read addresses stored in the N registers of the M register buffer includes storing the read addresses stored in the last N registers of a first-in first-out M register shift buffer.

12. The method of claim 8, wherein the preserving the read addresses includes:
starting a timeout counter for each register of the N registers when a read address is stored in the register;

preserving the contents of the register and advancing the timeout counter for the register when a read address continuous to the preserved read address is not received; and flushing the contents of the register when the corresponding timeout counter for the register times out.

13. The method of claim 8, wherein not prefetching the extra data includes not prefetching the extra data when the address of the read request corresponds to a memory block that does not include any of the other read addresses stored in the read address buffer.

14. A computing system comprising:
multiple host devices; and
a shared memory device to receive memory requests from the host devices, the memory device including:
a memory array including memory cells to store memory data;
a memory controller operatively coupled to the memory array and including:
a read address buffer including an M memory register buffer to store addresses of memory read requests received from the host devices and preserve N memory registers of the M memory registers, wherein M and are positive integers and N is less than M;
a prefetch buffer, and
logic circuitry configured to:
store extra read data in the prefetch buffer when determining an address of the read request is a continuous address of an address stored in a read address buffer;
omit prefetching of the extra read data when determining the address of the read request is a non-continuous address of an address stored in the read address buffer;
shift read addresses stored in M-N registers of the M memory registers when the address of the read request is continuous to a read address of the one of the M-N registers and not continuous to a read address of the N registers and preserving the read addresses stored in the N registers; and
flush a register of the N registers when the current read address is continuous to a read address stored in the N registers.

15. The computing system of claim 14, wherein the logic circuitry is configured to flush a preserved read address from the read address buffer when the address of the memory read request is continuous to the preserved read address, or a read address continuous to the preserved read address is not received within P read requests of a read request corresponding to the preserved read address, wherein P is a positive integer greater than M.

16. The computing system of claim 14, wherein the read address buffer of the memory controller is a first-in first-out M register shift buffer and the logic circuitry is configured to preserve the read addresses in the last N memory registers of the first-in first-out M register shift buffer.

17. The computing system of claim 14, including:
a timeout counter for each register of the N registers; and
wherein the logic circuitry is configured to:
start the timeout counter for a register of the N registers when a read address is stored in the register;
preserve the contents of the register and advance the timeout counter for the register when a read address continuous to the preserved read address is not received; and
enable the contents of the register to be overwritten when the corresponding timeout counter for the register times out.

18. The computing system of claim 14, wherein the read address buffer is a first-in first-out shift register that stores a record of read addresses for memory read requests.

* * * * *